United States Patent [19]
Yamashita

[11] Patent Number: 5,312,631
[45] Date of Patent: May 17, 1994

[54] METHOD OF PREVENTING CUT PIECES OF AGRICULTURAL PRODUCTS CONTAINING STARCH FROM STICKING TO EACH OTHER IN THE DRYING AND COOKING STEPS

[75] Inventor: Kosaku Yamashita, Osaka, Japan
[73] Assignee: Mikakuto Co., Ltd., Osaka, Japan
[21] Appl. No.: 881,749
[22] Filed: Apr. 28, 1992
[30] Foreign Application Priority Data
  Jan. 7, 1992 [JP] Japan .................................. 4-019455
[51] Int. Cl.$^5$ .............................................. A23B 7/10
[52] U.S. Cl. ........................................ 426/52; 426/254; 426/615; 426/637
[58] Field of Search ................ 426/52, 49, 615, 637, 426/28, 18, 20, 21, 44, 46, 254, 310, 331, 442, 544, 546, 629, 634, 654, 520, 523

[56] References Cited

U.S. PATENT DOCUMENTS

| | | | |
|---|---|---|---|
| 2,278,470 | 4/1945 | Musher | 426/52 |
| 2,598,838 | 6/1932 | Schermerhorn et al. | 426/52 |
| 3,917,852 | 11/1975 | Maraulja et al. | 426/52 |
| 4,058,631 | 11/1977 | Roan | 426/52 |
| 4,800,090 | 1/1989 | August | 426/243 |
| 4,906,483 | 3/1990 | Kloos | 426/243 |
| 5,120,552 | 6/1992 | Sherman | 426/52 |

FOREIGN PATENT DOCUMENTS 59-109764 6/1984 Japan .

Primary Examiner—Donald E. Czaja
Assistant Examiner—Leslie Wong
Attorney, Agent, or Firm—Armstrong, Westerman, Hattori, McLeland & Naughton

[57] ABSTRACT

A method for preventing cut pieces of agricultural products containing starch, particularly potatoes, from sticking to each other during the steps of drying and cooking, which includes washing the cut pieces with, or immersing the same in, a solution of an amylolytic enzyme, or an acidic or alkaline aqueous solution, or performing the washing or immersing treatment after blanching the cut pieces, thus saccharifying the starch existing on the surface of the cut pieces and removing the sugar thus formed from the cut pieces and thereby preventing the sticking of the cut pieces in the subsequent heating and drying steps.

8 Claims, No Drawings

METHOD OF PREVENTING CUT PIECES OF AGRICULTURAL PRODUCTS CONTAINING STARCH FROM STICKING TO EACH OTHER IN THE DRYING AND COOKING STEPS

BACKGROUND OF THE INVENTION

1. Field of the Invention

This invention relates to a method for preventing cut pieces of agricultural products containing starch, particularly those of potatoes, from sticking to each other in the drying and cooking steps.

2. Description of the Related Art Including Information Disclosed Under 37CFR 1.97-1.99

When cut pieces of agricultural products containing much starch, particularly those of poptatoes, are treated in various ways, such as heating, drying and cooking, the starch existing on the surfaces of said cut pieces tends to gelatinize to increase the viscosity of the water clinging to the surfaces. thus causing sticking of the cut pieces to each other and forming massive particles. It was therefore impossible to treat a large quantity of cut pieces at a time. Accordingly, it was necessary to supply cut pieces sparsely lined up to a dryer, as disclosed in U.S. Pat. No. 4,906,483, or to sparsely arrange cut pieces on a conveyer to a dryer, as disclosed in U.S. Pat. No. 4,800,090. These methods are suitable for treating a small quantity of cut pieces. but are not suitable undoubtedly when a large quantity of cut pieces is treated. In addition, it has also been attempted, as disclosed in Japanese Patent Kokai No. 109764/1984, to float cut pieces, while being passed through a heater and a dryer by means of a conveyer, by flowing a heat transfer medium, such as hot air and superheated steam, in large quantities, thereby preventing the cut pieces from sticking to each other. This method requires not only the use of a large-sized dryer but also a large quantity of energy to supply a sufficient air flow for floating the cut pieces, thereby markedly lowering the energy efficiency in the drying and cooking operations.

As described above, in order to prevent cut pieces of agricultural products containing much starch, particularly those of potatoes, from sticking to each other, were proposed a method of treating a small quantity of sparsely arranged cut pieces, a method of treating a large quantity of cut pieces sparsely dispersed in large-sized equipment and a method of treating cut pieces floated by a powerful air blast. However, these methods involve many problems in terms of plant investment and running cost, and no effective method has yet been developed. Frying of these cut pieces, on the other hand, rarely suffers from such problems because sticking of cut pieces to each other does not take place.

In recent years, the demand for low-calory and low-fat foodstuffs has been increasing because of the enhanced concern of general consumers for health. Attempts have been repeated for the industrial production of dried and crispened foodstuffs without frying in place of the conventional fried foodstuffs of a high calorific value containing much fat exemplified by potato chips, but no effective method has yet been developed. Thus, establishing a low-cost, industrial method for producing foodstuffs from potatoes and other agricultural products containing much starch by drying and crispening without frying will respond to the concern of consumers for health.

SUMMARY OF THE INVENTION

When the cut pieces of agricultural products containing much starch, such as potatoes, are dried and crispened without frying and without using a large sized, floating dryer, the water clinging to the surfaces is gelatinized, thus sticking the cut pieces to each other. Consequently, patches are formed in the following steps of drying and cooking, thus producing a large quantity of substandard products.

Under the circumstances, this invention was intended to provide a method which comprises pretreating the cut pieces of said agricultural products in a solution of an amylolytic enzyme, or in an acidic or alkaline aqueous solution, thereby rapidly saccharifying the starch existing on the surfaces of said agricultural products, and washing off almost all the sugar thus formed, thereby preventing the sticking phenomenon caused by starch gelatinization in the following heating and drying steps, and which therefore enables treatment of a large quantity of agricultural products at a time by using ordinary drying and cooking equipment, thus ensuring marked rationalization in terms of plant investment and running cost in said drying and cooking steps.

It was demonstrated that, if properly cut pieces of an agricultural product containing much starch, such as potatoes, are immersed in an aqueous solution of at least one of the following compounds ($\alpha$-amylase, $\beta$-amylase, gluco-amylase, other kinds of amylolytic enzymes, and substances containing the same) and then washed with water, thereby saccharifying the starch existing on the surface of said cut pieces and removing it therefrom the cut pieces can be dried and cooked with no danger of sticking to each other.

It is more preferable to blanch said cut pieces in hot water of 50° to 100° C. to gelatinize the starch existing on the surface thereof, followed by washing with water or hot water containing an enzyme described above, or immersing therein, thereby removing the starch.

It was also demonstrated that if the pH of the aqueous solution used for immersion and washing is adjusted to a level less than 4.0 or to a level higher than 10.0, more preferably, to a level less than 2.0 or higher than 12.0, by addition of an inorganic or organic acid, such as hydrochloric and oxalic acids, or a base, such sodium and potassium hydroxides, thus saccharifying the starch existing on the surfaces of said agricultural products and removing the sugar thus formed, the sticking phenomenon caused by starch gelatinization in the following heating and drying steps can be efficiently prevented.

In addition, it is also preferable that the cut pieces be blanched in hot water of 50° to 100° C. to gelatinize the starch existing on the surface thereof, and then immersed in, or washed with, an aqueous solution having a pH value as described above, thereby removing the starch sticking to the surfaces of said cut pieces.

Described below are the actions of this invention.

On the cut surfaces of agricultural products containing much starch, such as potatoes, is exposed starch, which can hardly be removed merely by washing with water or by blanching.

This invention utilizes the fact that, if properly cut pieces of an agricultural product containing much starch, particularly potatoes, are immersed and washed in an aqueous solution of at least one of the following compounds ($\alpha$-amylase, $\beta$-amylase, gluco-amylase, other kinds of amylolytic enzymes and substances containing the same) or in an aqueous solution with its pH adjusted to a level less than 4.0 or to a level higher than 10.0 by addition of an inorganic or organic acid, such as hydrochloric and oxalic acids, or a base, such as sodium and potassium hydroxides, the linkages in the molecules of the starch are cleaved, thus saccharifying or dextrinizating the starch into water-soluble, low-molecular substances which can be easily removed by washing.

The cut pieces thus treated do not stick to each other in the following drying and cooking steps, and hence can be uniformly and effectively dried and cooked by the use of various drying and cooking equipment conventionally employed.

Thus, an agricultural product containing much starch, such as potatoes, is cut into pieces of a proper shape, which are first blanched and then immersed in a solution containing an amylolytic enzyme to a concentration of 0.001 to 3.0 weight %, or in an acidic or alkaline solution with its pH adjusted to a level less than 4.0 or a level higher than 10.0, preferably to a level less than 2.0 or a level higher than 12.0, over a period of time in the range from several minutes to several hours, and the treated pieces are then drained and put in a suitable dryer, and drying and crispening are performed by flowing a heat transfer medium, such as hot air and superheated steam of 50° to 250° C. In the conventional methods, the starch existing on the surfaces of the cut pieces is gelatinized to cause sticking of the cut pieces to each other in the drying and crispening steps, thus forming heterogeneous products, but such problem does not occur at all when using cut pieces treated by the method of this invention.

Even when using a solution containing an amylolytic enzyme in an amount less than 0.001 weight %, the conversion of starch into sugar proceeds, but the treatment takes a long time and the sticking force of the cut pieces is practically same as that of untreated cut pieces, and hence the use of such a solution is insignificant. Since the conversion of starch into sugar proceeds sufficiently with a solution containing 3.0 weight % of said amylolytic enzyme, treatment with a solution containing said enzyme in an amount higher than 3.0 weight % is also insignificant because this solely increases the running cost.

In addition, even when the pH value of said acidic and alkaline solutions is higher than 4.0 or lower than 10.0, the conversion of starch into sugar proceeds, but the rate of this reaction is very low and the effect of preventing the sticking of cut pieces to each other cannot be observed.

In the drying and cooking steps, it is also possible to adopt the drying process of irradiating electromagnetic waves, such as infrared rays and microwaves, in combination with the flow of a heat transfer medium, such as hot air and superheated steam, as described above. In addition, all or part of these drying and crispening operations may also be performed under a reduced pressure.

In order to ensure the safety of foodstuffs produced by the method of this invention, it is essential that the cut pieces treated in the acidic or alkaline aqueous solution be immersed in an aqueous solution to which a base or an acid is added to effect neutralization, and then thoroughly washed with water, prior to the drying and cooking steps.

Other objects, features and advantages of this invention will become apparent from the following description and the appended claims.

DESCRIPTION OF THE PREFERRED EMBODIMENTS

The following Examples are intended only to illustrate the practice of this invention and are not intended to limit its scope. Many widely different embodiments may be made without departing from the spirit and scope of the claims.

Example 1

Potatoes thoroughly washed were sliced into pieces 1.8 mm thick and about 30 mm wide, which were immersed in a sufficient volume of cold water and then drained. Each of the dry cut pieces thus obtained was immersed in hot water of 70° C. for 30 minutes with mild stirring (Sample 1), in an aqueous solution of α-amylase with mild stirring (Sample 2), in an aqueous solution of β-amylase with mild stirring (Samples 3 through 5), in hydrochloric acid with mild stirring (Sample 6), or in an aqueous solution of sodium hydroxide with mild stirring (Sample 7). For the seven kinds of samples thus obtained, was measured the adhesion between the sliced pieces caused by the gelatinized starch on the surfaces. This measurement was carried out by using two cut pieces as test samples, piling one piece on part of the other piece, and measuring the slide peeling strength for ten test samples of each Sample by the use of Rheo Meter NRM-2010-CW (product of Fudo Kogyo Co., Ltd.).

Table 1 shows the treating conditions and the results of measurement for each of Samples. It was demonstrated that the presence of an enzyme in the blanching solution and the changes in pH value cause a marked reduction in the sticking force. In addition, it was also demonstrated that no distinct reduction in the sticking force is observed when the enzyme concentration is less than 0.01 weight % or higher than 3.0 weight %.

TABLE 1

Variations of Sticking Force by Treatment with Amylolytic Solution, Acidic Solution and Alkaline Solution

| Sample | Treating Conditions | | | | Sticking Force (g/cm$^2$) | | |
|---|---|---|---|---|---|---|---|
| | Solute | Concn./pH | Soln. Temp. | Immersion Time | Average | Min. Value | Max. Value |
| 1 | — | — | 70° C. | 30 minutes | 4.86 | 3.8 | 6.1 |
| 2 | α-Amylase[1] | 0.1 wt % | 70° C. | 10 minutes | 1.16 | 0.8 | 1.3 |
| 3 | β-Amylase[2] | 0.001 wt % | 70° C. | 180 minutes | 4.06 | 3.1 | 5.1 |
| 4 | β-Amylase[2] | 0.1 wt % | 70° C. | 10 minutes | 1.24 | 0.8 | 1.4 |
| 5 | β-Amylase[2] | 3.0 wt % | 70° C. | 10 minutes | 0.95 | 0.6 | 1.2 |
| 6 | HCl | pH 1.0 | 70° C. | 30 minutes | 1.70 | 1.2 | 2.3 |
| 7 | NaOH | pH 12.9 | 70° C. | 30 minutes | 2.82 | 2.2 | 3.4 |

[1] Liquefying Enzyme K ®; product of Ueda Chemical Co., Ltd.
[2] β-Amulase #1500S ®; product of Nagase Biochemical Industry Co., Ltd.

Example 2

Potatoes thoroughly washed were sliced into pieces 1.8 mm thick and about 30 mm wide, which were immersed in a sufficient volume of cold water, drained, and then blanched in hot water of 80° C. for one minute with mild stirring (Sample 8). Each of the blanched pieces was immersed in an aqueous solution of α-amylase with mild stirring (Sample 9), in an aqueous solution of gluco-amylase with mild stirring (Sample 10), in an aqueous solution of oxalic acid with mild stirring (Samples 11 and 12), or in an aqueous solution of sodium hydroxide with mild stirring (Samples 13 and 14). For the seven kinds of samples thus obtained, was measured the adhesion between the sliced pieces caused by the gelatinized starch on the surfaces in the same way as in Example 1. Table 2 shows the treating conditions and the results of measurement for each of Samples. It was demonstrated that the increased sticking force on the surfaces of cut pieces caused by gelatinization of starch after blanching treatment is reduced by the following immersion in a solution of enzyme, in an acidic aqueous solution or in an alkaline aqueous solution. In addition, it was also demonstrated that no distinct reduction in the sticking force is observed when the pH value of the blanching solution is higher than 4.0 and lower than 10.0.

TABLE 2

Variations of Sticking Force by Treatment with Amylolytic Solution, Acidic Solution and Alkaline Solution after Blanching

| | Treating Conditions | | | Immersion | Sticking Force (g/cm$^2$) | | |
|---|---|---|---|---|---|---|---|
| Sample | Solute | Concn./pH | Soln. Temp. | Time | Average | Min. Value | Max. Value |
| 8 | — | — | — | — | 5.00 | 4.0 | 6.2 |
| 9 | α-Amylase[1] | 0.05 wt % | 60° C. | 5 minutes | 0.78 | 0.5 | 1.1 |
| 10 | Gluco-amylase[3] | 0.05 wt % | 60° C. | 5 minutes | 1.16 | 0.7 | 1.3 |
| 11 | Oxalic acid | pH 1.2 | 60° C. | 20 minutes | 1.30 | 0.8 | 1.6 |
| 12 | Oxalic acid | pH 4.0 | 60° C. | 180 minutes | 3.79 | 3.1 | 4.5 |
| 13 | NaOH | pH 10.0 | 60° C. | 180 minutes | 4.23 | 3.7 | 4.9 |
| 14 | NaOH | pH 12.9 | 60° C. | 20 minutes | 2.62 | 2.0 | 3.1 |

[1]Liquefying Enzyme K ®; product of Ueda Chemical Co., Ltd.
[3]Glucozyme ®; product of Nagase Biochemical C., Ltd.

Example 3

Potatoes thoroughly washed were sliced into pieces 1.8 mm thick, which were immersed in a sufficient volume of cold water, drained, and then blanched in hot water of 80° C. for one minute with mild stirring (Sample 15). Each of the blanched pieces was immersed in an aqueous solution of β-amylase with mild stirring (Sample 16), or in an aqueous solution of oxalic acid with mild stirring, followed by neutralization with calcium carbonate to pH 5.0 and thorough washing with water (Sample 17). The three kinds of samples thus obtained (2.2 Kg each) were put in a rotary dryer and dried for six minutes by flowing hot air of 250° C., and the dry state and sticking of cut pieces to each other were measured.

Table 3 shows the treating conditions and the results of measurement for each of Samples. The water content was measured by using an infrared moisture meter. "Stick" shown in the table (a state of dried products) means that drying proceeded with two or more sliced pieces being sticked to each other; "Fracture" means that breaking or cracking occurred to change the original shape after slicing, although no sticking of sliced pieces to each other was observed; "Satisfactory" means that sliced pieces were dried with the original shape remaining unchanged and with no sticking of sliced pieces to each other being observed; and the percentages of these states are expressed by the ratio for the number of pieces.

It was demonstrated that immersion in a solution of β-amylase or in acidic solution after blanching caused no sticking of sliced pieces in the following step of drying by the use of a rotary dryer. Consequently, the water-content dispersion of dried products caused by the sticking of sliced pieces to each other was markedly decreased, thereby ensuring uniform drying operation and an enhanced yield in the drying step.

TABLE 3

Comparison of Dry and Stick Conditions after Treatment with a Solution of β-Amylase and an Acidic Aqueous Solution

| | Treating Conditions | | | | Average Water | State of Dried Products | | |
|---|---|---|---|---|---|---|---|---|
| Sample | Solute | Concn./pH | Soln. Temp. | Time | Content (%) | Satisfactory | Fracture | Stick |
| 15 | — | — | — | — | 15.7% | 18% | 6% | 76% |
| 16 | β-Amylase[2] | 1.0 wt % | 60° C. | 5 minutes | 7.5% | 97% | 3% | No |
| 17 | Oxalic acid | pH 1.2 | 80° C. | 30 minutes | 4.5% | 96% | 4% | No |

[2]β-Amulase #1500S ®; product of Nagase Biochemical Industry Co., Ltd.

The rotary dryer used here contains a drying room 300 mm in internal diameter and 350 mm in length, and the packing rate by volume was about 19% when 2.2 Kg of sliced pieces of potato were put in. The dryer of this type is generally operated with a packing rate of about 10%, and this indicates that a very efficient drying operation was performed in terms of plant investment and running cost.

In the Examples described above, were used potatoes as agricultural products containing starch, but sweet potatoes, pulses, rice and other agricultural products can be operated by the method of this invention.

The method of this invention is thus intended to prevent cut pieces of agricultural products containing starch from sticking to each other in the drying and cooking steps by washing said cut pieces in an aqueous solution containing at least one of the following compounds (α-amylase, β-amylase, gluco-amylase, other kinds of amylolytic enzymes and substances containing the same) in an amount in the range from 0.001 to 3.0 weight %, or in an aqueous solution with its pH adjusted to a level less than 4.0 or to a level higher than 10.0 by addition of an inorganic or organic acid, such as hydrochloric and oxalic acids, or a base, such as sodium and potassium hydroxides, thereby converting the starch on the surfaces of said cut pieces into water-soluble sugar. It is very effective in preventing the sticking of said cut pieces to each other, which has been a serious problem of inhibiting the treatment of a large quantity when producing foodstuffs by drying and crispening without frying. Use of the method of this invention enables the treatment of a large quantity of raw materials at a time by the use of various drying and cooking equipment conventionally employed, thus markedly decreasing the plant investment and the running cost.

Uniform drying and cooking operations can be performed even when treating a large quantity of cut pieces because of a high degree of cut-piece dispersion, thus enhancing the yield and quality of products.

The starch on the surfaces of cut pieces of agricultural products can be effectively removed by blanching said cut pieces in hot water of 50° to 100° C. to gelatinize it, followed by washing with, or immersion in, a solution containing an enzyme mentioned above.

What is claimed is:

1. A method for preventing cut pieces of agricultural products containing starch from sticking to one another, comprising
   (i) blanching said cut pieces in hot water at a temperature of 50°-100° C. for a time effective to gelatinize starch present on surfaces of said cut pieces,
   (ii) contacting said cutpieces with a solution containing at least one member selected from the group consisting of an amylolytic enzyme, an acidic compound and a basic compound for a time effective to saccharify starch present on surfaces of said cut pieces of agricultural products into sugar, and
   (iii) separating said sugar from said cut pieces of agricultural products.

2. The method of claim 1, further comprising drying and cooking said cut pieces of agricultural products.

3. The method of claim 1, wherein said solution comprises water and at least one amylolytic enzyme selected from the group consisting of α-amylase, β-amylase and gluco-amylase in an amount of from 0.001 to 3.0 weight percent.

4. The method of claim 3, wherein said water is above room temperature.

5. The method of claim 1, wherein said solution comprises water and an inorganic or organic acid such that the pH of said solution is less than 4.0.

6. The method of claim 5, wherein said acid is selected from the group consisting of hydrochloric acid and oxalic acid.

7. The method of claim 1, wherein said solution comprises water and a base such that the pH of said solution is greater than 10.0.

8. The method of claim 7, wherein said base is selected from the group consisting of sodium hydroxide and potassium hydroxide.

* * * * *